Patented June 5, 1923.

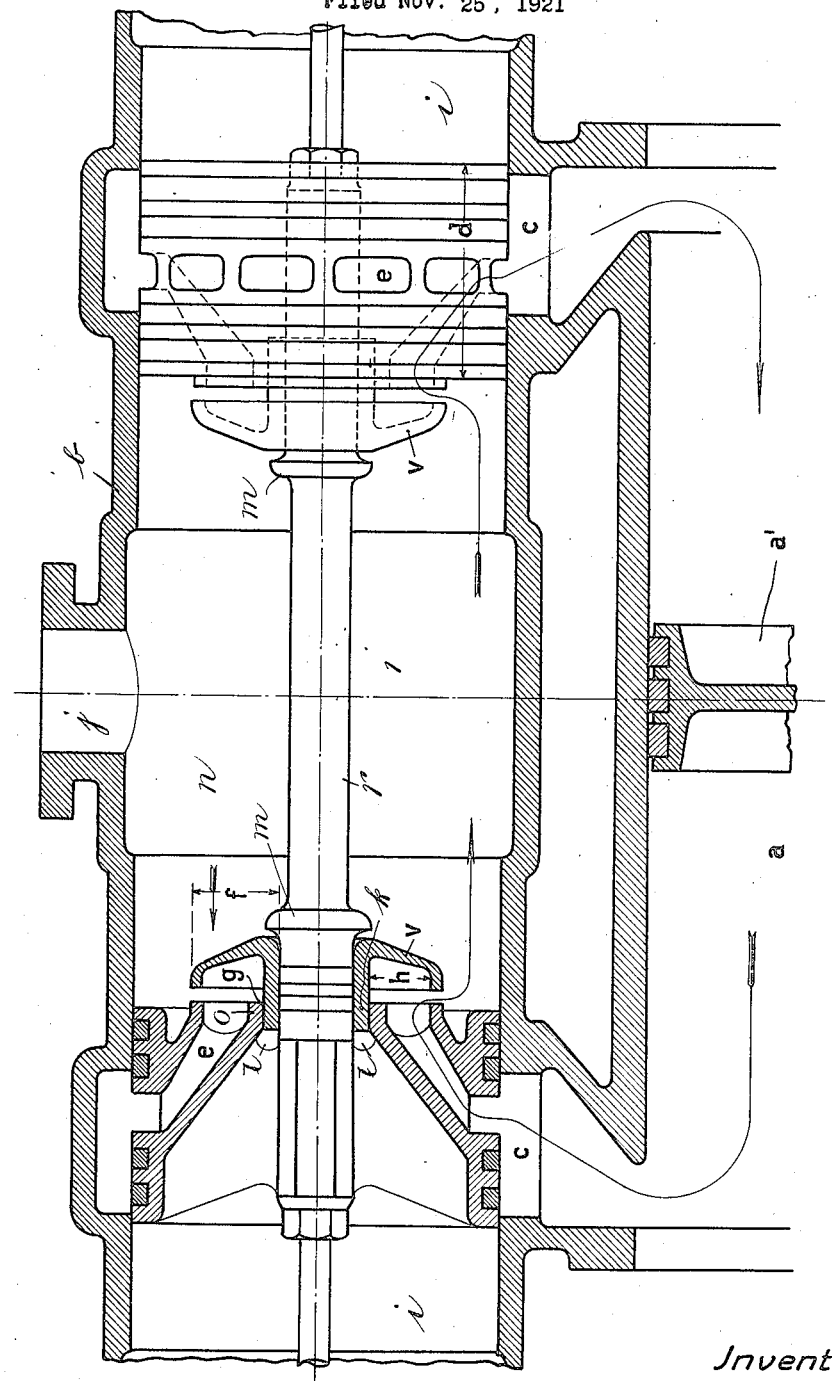

1,458,101

UNITED STATES PATENT OFFICE.

HEINRICH KOCH, OF HAMM, GERMANY.

PRESSURE-EQUALIZING VALVE FOR PISTON VALVES.

Application filed November 25, 1921. Serial No. 517,769.

*To all whom it may concern:*

Be it known that I, HEINRICH KOCH, of German nationality, residing at Hamm, i/Westfalen, Germany, have invented certain new and useful Improvements in a Pressure-Equalizing Valve for Piston Valves; and I do hereby declare the following to be a full, clear, and exact description of the invention, of which the following is a specification.

The invention relates to a pressure equalizing valve for piston valves. Spring loaded pressure equalizing valves are known which, however, only operate when the pressure in the cylinder exceeds the inlet or boiler pressure. They therefore do not equalize the pressure on both sides of the cylinder piston when low pressures or partial vacuums are formed in the cylinder when the engine is running free. These low pressures or partial vacuums become so serious, especially when locomotives run free for a long time, for instance when travelling down long gradients as to result in jamming of the piston. Under no lead conditions, a sudden change of pressure sometimes occurs, the very irregular low pressures or partial vacuums frequently resulting in the breaking of the piston rod.

Attempts have been made to obviate the disadvantages, which occur when using the known pressure equalizing valves, by providing additional valves and connecting passages in the inlet chamber of the piston valve casing and in the cylinder itself. Disregarding the fact that these means do not entirely avoid the disadvantages, the maintenance costs of the plant are increased. They further increase the clearance or waste space and therefore lead to greater consumption of steam and thus increase the working costs.

The above disadvantages are obviated by the invention according to which each equalizing valve is not only subjected to the differential action of the pressures in the cylinder and the inlet chamber, but is, over a certain area, also subjected to the differential action of the pressures in the exhaust and inlet chambers, so that, not only will each valve open when an excess pressure occurs in the corresponding end of the cylinder, to allow the excess pressure fluid to escape into the inlet chamber, but, said valves will open and remain open when and so long as there is a vacuum or partial vacuum being formed in either end of the cylinder, whereby both ends of the cylinder are put into communication with one another and the pressures therein are equalized.

The accompanying drawing illustrates by way of example one form of construction according to the invention.

The cylinder $a$ of the steam engine is as usual provided with the piston $a'$ and the piston valve casing $b$. The outer sides thereof communicate with the exhaust pipe $i$. The central space may be closed and connected to the steam supply as at $j$. The pressure equalizing valves $v$ are provided on the piston valve $d$ which is mounted on the piston valve rod $r$. They control the passages $e$ which are provided in the piston valve.

The cylinder is provided with ports $c$, for the admission and exhaust of the steam, controlled by the piston valve $d$. The passages $e$ are so arranged that they remain in communication with the ports $c$ until the piston reaches its mid-position in the cylinder $a$.

One side of each equalizing valve, namely, that directed towards the inlet chamber $n$ of the piston valve casing, and on an area equal to the annular surface of width $f$ is subjected in known manner to the inlet pressure, or the pressure occurring at any time in the inlet chamber. The hub $k$ of each valve $v$ is guided between the rod $r$ of the piston valve and the hub $o$ of the piston valve. According to the invention the hub $k$ of the valve $v$ slides in a central opening $g$ in the piston valve, which leads to the exhaust side of the piston valve casing. The exhaust pressure acts on the front surface of this part of the valve $v$. This pressure being usually atmospheric pressure in the case of locomotives.

Cylinder pressure acts on the annular surface of width $h$, of each valve $v$.

The valves are not provided with springs.

The movement of each valve is limited in one direction by the valve seating, and in the other direction, for example, by a shoulder $m$ on the piston valve rod $r$.

If in either end of the working cylinder $a$ an excess pressure is opposed to the inlet pressure, the corresponding pressure equalizing valve opens in the same manner as the known type of valve, such as is shown in U. S. Patent No. 654,382, in consequence of the pressure acting on the annular surface $h$, so that the excess pressure fluid can pass out through the inlet chamber $n$ of the piston valve casing. If however a vacuum occurs in either end of the cylinder when the piston $a'$ is working idly, or in other words, when the steam pressure is cut off, then during the inlet period a vacuum will occur in the inlet chamber $n$ of the piston valve casing according to the position of the piston valve. Consequently the valve $v$ will open under the action of the exhaust pressure, for example, atmospheric pressure acting on the surface $l$ thereof. It remains open under the action of this pressure after the piston valve has interrupted the communication between the working cylinder and the inlet chamber of the piston valve casing. Consequently the contents on one side of the cylinder can flow through the passages $e$ to the other suction side of the cylinder, and so prevent the occurrence or increase of a vacuum.

During the normal operation of the engine the pressure equalizing valves are kept closed by the excess pressure occurring in the inlet chamber $n$.

The omission of a spring on the pressure equalizing valve has the advantages that the breaking of springs, which are frequently in a highly heated condition, and the interruptions in working caused thereby, are avoided.

I claim:—

In a steam engine, a valve casing communicating with an exhaust pipe at its ends and having an inlet chamber, a piston valve having two spaced valve bodies connected by a rod, each valve body of the piston valve being provided with passages communicating with the engine cylinder and the inlet chamber of the valve casing, hubs formed on the valve bodies and encircling the connecting rod in spaced relation thereto to afford an annular space between said hubs and the connecting rod, pressure equalizing valves loosely mounted on said connecting rod and coacting with said piston valve bodies to normally close the passages therein, hubs formed on said pressure equalizing valves and being guided in the annular space between the hubs of the valve bodies and the connecting rod, and shoulders on said connecting rod for limiting the opening movement of the pressure equalizing valves, said pressure equalizing valves being automatically opened by the differential action of the pressures in the engine cylinder and the inlet chamber when the pressure of the engine cylinder exceeds that in the inlet chamber of the valve casing and also being automatically opened by the differential action of the pressures in the exhaust pipe and the inlet chamber when a vacuum is formed in the engine cylinder, whereby both ends of the engine cylinder are put into communication with each other and the pressures therein are equalized.

The foregoing specification signed at Hamm, Westfalen, 25 October, 1921.

HEINRICH KOCH.

In presence of—
 HEINRICH NOFTZ,
 CARL MOTT.